United States Patent
Merchak et al.

[11] Patent Number: 5,904,878
[45] Date of Patent: May 18, 1999

[54] FLUORESCENT ORANGE AZO PIGMENTS

[75] Inventors: Paul A. Merchak, Loveland; Russell J. Schwartz; Manuel Z. Gregorio, both of Cincinnati, all of Ohio

[73] Assignee: Sun Chemical Corporation, Fort Lee, N.J.

[21] Appl. No.: 08/856,379

[22] Filed: May 14, 1997

[51] Int. Cl.⁶ .............................. C09K 11/00; C09B 67/00
[52] U.S. Cl. .............................. 252/301.16; 252/301.35; 106/496; 106/31.64; 106/31.79; 106/31.8; 106/31.81; 118/668; 118/712; 283/62; 428/187; 428/195; 428/690
[58] Field of Search .................. 106/496, 31.64, 106/31.79, 31.8, 31.81; 252/301.16, 301.35; 118/668, 712; 283/62; 428/187, 195, 690

[56] References Cited

U.S. PATENT DOCUMENTS

| | | | |
|---|---|---|---|
| 2,929,931 | 3/1960 | Richter et al. | 250/71 |
| 2,938,292 | 5/1960 | Jaskowsky et al. | 41/4 |
| 2,983,686 | 5/1961 | Konig et al. | 252/301.2 |
| 3,105,908 | 10/1963 | Burkhardt et al. | 250/219 |
| 3,115,417 | 12/1963 | Christensen | 117/33.5 |
| 3,162,642 | 12/1964 | McCafferty | 260/304 |
| 3,177,153 | 4/1965 | Pommer et al. | 252/301.2 |
| 3,407,196 | 10/1968 | Liechti et al. | 260/240 |
| 3,420,821 | 1/1969 | Schinzel et al. | 260/240 |
| 3,423,407 | 1/1969 | Strobel et al. | 260/240 |
| 3,492,478 | 1/1970 | Smith | 250/71 |
| 3,560,238 | 2/1971 | Rothery | 117/12 |
| 3,597,364 | 8/1971 | Okabo et al. | 252/301.2 W |
| 3,599,389 | 8/1971 | Hartman | 53/51 |
| 3,614,430 | 10/1971 | Berler | 250/71 R |
| 3,617,171 | 11/1971 | Ribka | 106/496 |
| 3,671,451 | 6/1972 | Butterfield | 252/301.2 |
| 3,759,731 | 9/1973 | Kühne et al. | 106/496 |
| 3,760,161 | 9/1973 | Lohne et al. | 235/61.11 E |
| 3,775,148 | 11/1973 | Bradley | 106/288 Q |
| 3,776,749 | 12/1973 | McKay et al. | 106/288 Q |
| 3,776,761 | 12/1973 | Kato et al. | 117/76 P |
| 3,892,972 | 7/1975 | Cevasco | 250/458 |
| 3,960,755 | 6/1976 | Beachem et al. | 252/301.16 |
| 3,980,635 | 9/1976 | Hunger et al. | 106/496 |
| 4,006,158 | 2/1977 | Fleck et al. | 260/308 B |
| 4,015,131 | 3/1977 | McDonough et al. | 250/461 R |
| 4,341,701 | 7/1982 | Pechey et al. | 260/161 |
| 4,370,269 | 1/1983 | Weigarten et al. | 106/496 |
| 4,467,207 | 8/1984 | Lerner et al. | 250/459.1 |
| 4,476,052 | 10/1984 | Hunger et al. | 106/496 |
| 4,968,352 | 11/1990 | Keys et al. | 106/494 |
| 4,983,661 | 1/1991 | Ali et al. | 524/423 |
| 5,095,056 | 3/1992 | Bäbler et al. | 524/90 |
| 5,352,280 | 10/1994 | McKay | 106/20 C |

FOREIGN PATENT DOCUMENTS 1393379   5/1975   United Kingdom .................. 106/496

OTHER PUBLICATIONS

Peter A. Lewis, *Pigment Handbook*, vol. 1, Second Edition, pp. 860–861, 1988. No month.

Willy Herbst and Klaus Hunger, *Industrial Organic Pigments*, pp. 555–556, 1993. No month.

Peter A. Lewis, *Pigment Handbook*, vol. 1, Second Edition, pp. 861–879, 1988. No month.

ASTM Designation: E 1247–92, *Standard Test Method for Identifying Fluorescense in Object–Color Specimens by Spectrophotometry*, pp. 1–2, Dec. 1992.

*Primary Examiner*—Melissa Bonner
*Attorney, Agent, or Firm*—Sidney Persley

[57] ABSTRACT

Orange azo fluorescent pigments and a process for a preparing same. Orange azo fluorescent pigments as a component of printing ink, coating, plastic compositions and articles of manufacture and used for controlling manufacturing operations.

29 Claims, 2 Drawing Sheets

FLUORESCENT ORANGE AZO PIGMENTS

FIELD OF THE INVENTION

The present invention is directed to fluorescent orange azo pigments and a process for preparing same. The invention is also directed to printing ink, coating and plastic compositions and articles of manufacture containing these pigments.

BACKGROUND OF THE INVENTION

Fluorescent colorants are well known and represent an important class of materials commonly used in coloring printing inks, paints and plastics to impart a desired color. For example, the prior art describes a number of fluorescent organic dyes; see for example U.S. Pat. Nos. 2,929,931; 2,938,292; 2,983,686; 3,105,908; 3,115,417; 3,162,642; 3,177,153; 3,407,196; 3,420,821; 3,423,407; 3,492,478; 3,560,238; 3,597,364; 3,599,389; 3,614,430; 3,671,451; 3,760,161; 3,776,761; 3,892,972; 3,960,755; 4,006,158; 4,015,131. These include, stilbenes (such as diamino-stilbene-di-sulfuric acid), berberin sulfate tetra-ethyl-diamino-o-carboxyphenyl, xanthenyl chloride, tetramethyl-di-amino-dephenyl-ketoamine hydrochloride, auranin, xylene red B, rhodamine B, rhodamine 6G, and fluorescein.

The fluorescent organic dyes in the prior art are also used in marking applications such as machine sorting, mail sorting and web registration control in manufacturing operations. For some applications it is desired that the marking be colorless when viewed under visible light and emit visible radiation when irradiated by an ultraviolet incident light source. In these particular applications, however, it is not sufficient that the marking only emit radiation when irradiated, the marking must emit radiation at a different and higher wavelength than the incident light and at a level sufficient to be detected by a detector such as that described in U.S. Pat. No. 4,467,207. Also, it is equally important that the markings do not bleed or migrate through the web or substrate so as to enlarge or relocate the marking.

U.S. Pat. No. 4,467,207 describes various fluorescent organic dye compounds that do not migrate or bleed in marking applications for thermoplastic webs. These include coumarin dyes such as 4-methyl-7-(sulfo methyl amino) coumarin sodium salt, benzoxazoles, stilbene dyes such as Phorite CL, Phorite BA (available from Verona Dyestuff Division, Mobay Chemical Corporation), TH-40 (available form Sandoz Corporation, East Hanover, N.J.), and IR-125, a dark red organic laser dye (available from Eastman Kodak Corporation, Rochester, N.Y.).

As previously mentioned, fluorescent organic dyes suffer from migration or bleeding. This not only presents a problem in marking applications but lessens the effect of the color. In addition, this becomes a serious health concern where the fluorescent organic dyes are used in food packaging applications or in any application where the dye may come in contact with the skin. In general, organic dyes also have low thermal stability, thereby precluding their use at high temperatures.

In order to overcome some of the practical limitations in using fluorescent organic dyes, fluorescent pigments, which represent another class of colorants, are sometimes employed. Broadly speaking, the essential difference between a organic dye and organic pigment is solubility. Conventional fluorescent organic pigments (actually made of organic dyes dissolved in a resin matrix, which resin in turn may not be soluble in the application medium) tend to suffer from migration and plateout. For example, along with being thermally unstable, organic dyes are fairly soluble in plastics while pigments are insoluble and have higher thermal stability. The prior art describes only a limited number of fluorescent organic pigments. No fluorescence is found, for example, in commonly used organic pigments such as Pigment Red 188, Pigment Red 202 and Pigment Orange 36.

European Patent No. EP 0495338 B teaches a heat stable Pigment Red 202 having increased crystallite size. However, it reports that increased crystallite size can be achieved only when the pigment is substantially fluorescence free. Thus, the prior art teaches that an increase in the particle size of an organic pigment is accompanied by a decrease in fluorescence and vice versa.

U.S. Pat. Nos. 4,370,269 and 4,476,052 describe pigments having improved hiding power such as Pigment Orange 36 but neither teaches that the pigment possess any fluorescent properties.

U.S. Pat. Nos. 3,162,642 and 4,983,661 describe a "fluorescent pigment" used in marking applications. However, these pigments are classical organic dyes dissolved in a resin matrix. The resin matrix is then formed to a specific size, typically of several microns, so that it may be used as a pigment. Organic pigments of this type are further described by P. A. Lewis, *Pigment Handbook,* on pages 860–61.

Herbst and Hunger, *Industrial Organic Pigments,* on pages 555–556, describe a fluorescent Pigment Yellow 101, a disazomethine compound. However, this compound is not in the same class of disazo pigment compounds as the present invention.

Orange azo pigments represent an important class of organic pigments and include monoazo orange and disazo orange pigments. Orange azo pigments are well known and are typically derived by coupling an acetoacetanilide, pyrazolone, benzimidazolone, beta-napthol or naphthol AS derivatives with a diazonium or bis-diazonium salt of an aromatic amine or diamine. A number of patents are available which describe the preparation and various uses for these pigments; see for example U.S. Pat. Nos. 3,617,171; 3,759,731; 3,775,148; 3,776,749; 4,341,701; 4,968,352; and 5,352,280. These pigments are not commonly known to exhibit fluorescence when exposed to incident radiation.

While not wishing to be bound by theory, it is believed that the chemical structure and physical form of a pigment greatly influences whether or not it will be fluorescent. P. A. Lewis, *Pigment Handbook,* on pages 861–879, provide a detailed discussion on the theory of fluorescence dye based organic pigments. The properties of commercial grade organic pigments depend, in most instances, on process treatments which are used extensively to generate the various pigment grades for select applications. These treatments, may for example, involve chemical reactions which modify particle size, crystallite size, distribution and overall crystal morphology of the pigment. These all effect such properties such as shade, color strength, dispersibility, rheology, gloss, etc. It is also known that heat treating a pigment, for example, in a slurry, can cause crystallite growth. No where in the prior art, however, does it indicate that such modifications would impart fluorescence.

It is an object of the present invention to provide fluorescent orange azo pigments.

It is a further object of the present invention to provide fluorescent orange azo pigments that do not migrate or bleed from inks to thermoplastic webs or substrates.

It is yet a further object of the present invention to provide printing inks, coatings and plastics that contain, as a component, the fluorescent orange azo pigments of the present invention.

Other objects and advantages of the invention will become apparent from the following description of embodiments.

SUMMARY OF THE INVENTION

The invention is fluorescent orange azo pigments exhibiting a spectral response to incident radiation where the maximum response at a wavelength of 630 nanometers exceeds the response at 700 manometers.

In another aspect the invention provides for printing ink, coating and plastic compositions containing at least one fluorescent orange azo pigment exhibiting a spectral response to incident radiation where the maximum response at a wavelength of 630 nanometers exceeds the response at 700 nanometers.

In another aspect the invention provides a process for preparing fluorescent orange azo pigments.

In yet another aspect the invention provides improvements in the manufacturing or packaging of thermoplastic materials by providing printing inks having non-migrating markings comprised of organic pigments.

DESCRIPTION OF THE INVENTION

It has been surprisingly discovered that orange azo pigments can be made to fluoresce remarkably when exposed to incident radiation. The pigments emit at higher wavelengths where the incident radiation is reflected and not absorbed. The result is an increased spectral response and a cleaner and brighter shade of pigment. It should be noted that the shade is cleaner and brighter than that observed when no increase spectral response is obtained.

The orange azo pigment compositions of the present invention include disazo orange and monoazo orange pigments and more particularly include diarylide orange and disazopyrazolone orange pigments such as Pigment Orange 13, Pigment Orange 16 and Pigment Orange 34; most preferred, however, is Pigment Orange 16.

In the present invention, the fluorescence of each sample prepared by the present invention was visually observed using a standard light box having an ultraviolet light source. The spectral response (% reflectance) for each sample was quantitatively measured with a CS-5 ChromaSensor color spectrophotometer (available from Applied Color Systems, Inc.) that has a tungsten-halogen lamp. The instrument settings were: D65 (CIE standard illuminant) 10 degrees, large area and specular.

In order to quantify the degree of fluorescence exhibited by a sample material containing the pigment, an empirical rating system was developed whereby the degree of fluorescence is rated from 0 to 10. A rating of 0 means the sample exhibits no fluorescence, while a rating of 10 means the sample exhibits an extremely high level of fluorescence. In addition, ten independent ratings were obtained for each sample using the rating system. The ratings were then averaged to generate a final value. The average rating for each sample is shown in the Table, i.e. Visual.

The degree of fluorescence exhibited by the orange azo pigments of the present invention has been defined by the percent increase in percent reflectance in the wave length region of maximum reflectance. For example, for Pigment Orange 16 this is at 700 nanometers. The spectral response or percent reflectance a various wavelengths was plotted for Pigment Orange 16 in the wavelength region of maximum response.

Figure 1:
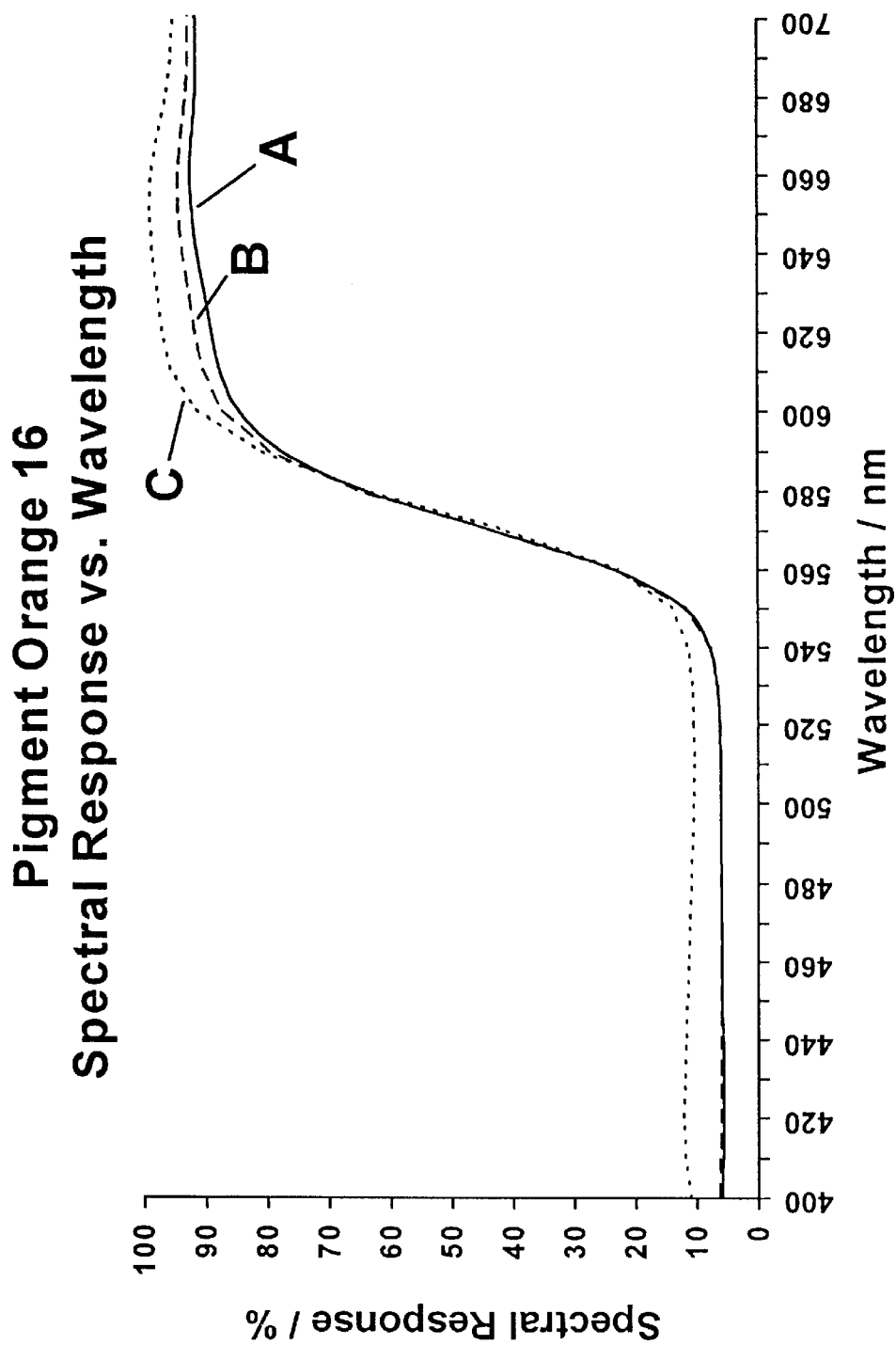
FIG. 1 shows a plot of the spectral response for Pigment Orange 16 as a function of wavelength in the region 400 to 700 nanometers.
Figure 2:
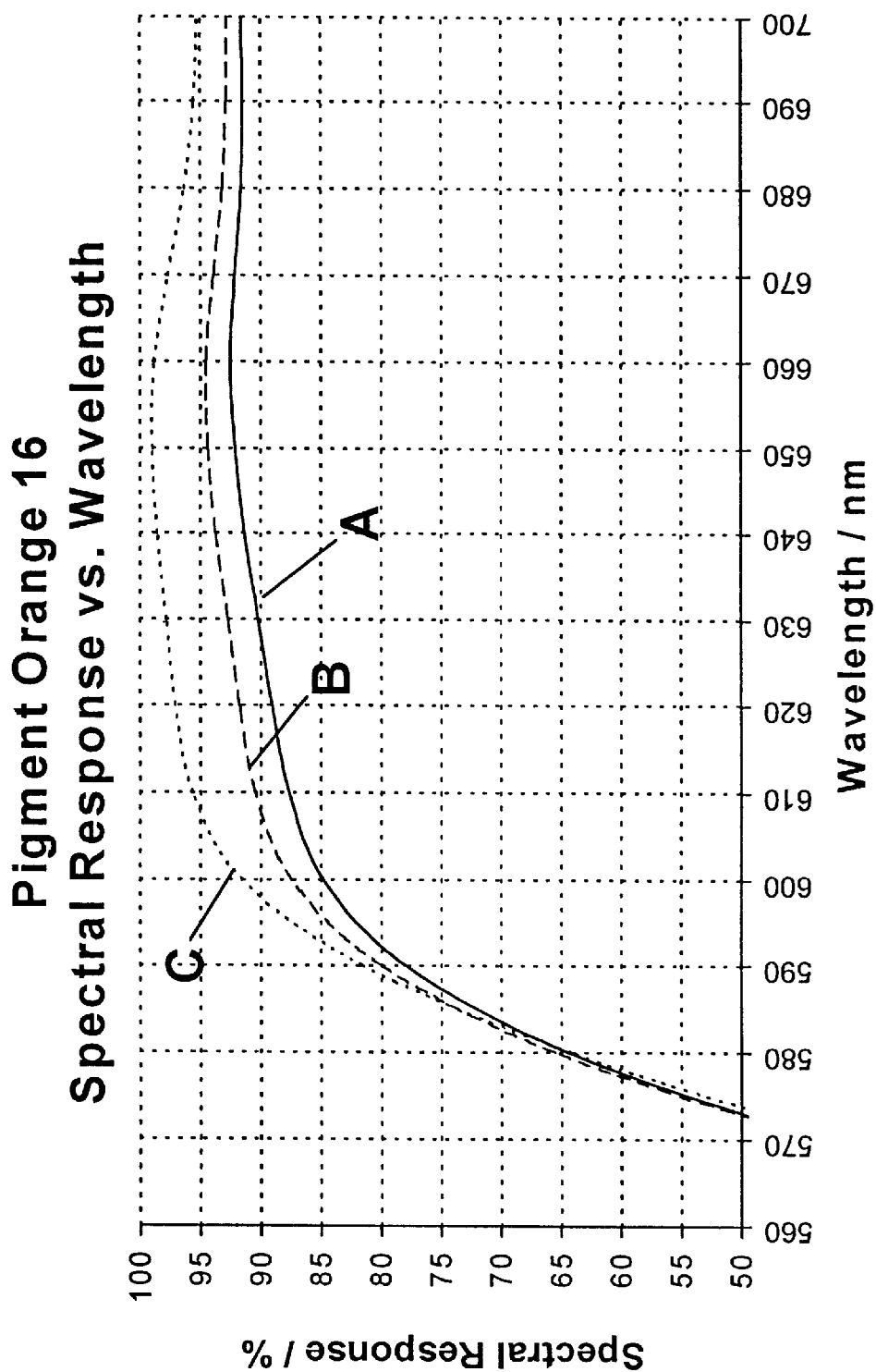
FIG. 2 shows enlarged plot of the spectral response for Pigment Orange 16 as a function of wavelength in the region of maximum response.

The spectral response graph for Pigment Orange 16 is depicted in FIGS. 1 and 2. The reflectance was measured over a white background but a black background could also have been used. Using a white background we observed an increase in the percent reflectance at an incident wavelength of 620 nanometers. FIGS. 1 and 2 show the maximum increase in spectral response for Pigment Orange 16 as prepared in Example 1 (Curve A), Example 2 (Curve B) and Example 3 (Curve C). As can be seen, the maximum response occurs at a different wavelength for each Example.

FIG. 2 more clearly illustrates the advantages of the present invention. Curve B shows the spectral response for Pigment Orange 16 prepared in accordance with Example 2, wherein the pigment intermediate is slurried in water. Curve C shows the spectral response for Pigment Orange 16 prepared in accordance with Example 3, wherein the pigment intermediate is slurried in ethanol. While Example 2 yielded a pigment with a maximum relative percent increase in spectral response of 3 percent, Example 3 yielded a pigment with a maximum relative increase of 8 percent. The percent increase in spectral response for Pigment Orange 16 achieved under the present invention was totally unexpected and represents a substantial change in the characteristic physical properties for the pigment.

In order to appreciate the significance of the results achieved under the present invention, a publication by the American Society for Testing Materials (ASTM), ASTM Designation: E 1247-92, *The Standard Method for Identifying Fluorescence in Object-Color Specimens by Spectrophotometry*, states that fluorescence is considered significant if spectral reflectance differs by only 1% of full scale at the wavelength of greatest difference. When the results are evaluated on this basis, the orange azo pigments of the present invention represent a substantial and unprecedented change in the fluorescent properties of these pigments.

The fluorescent orange azo pigments of the present invention may be prepared by adding an aromatic amine or diamine to hydrochloric acid in a 1:2.5 equivalent ratio and an equivalent amount of sodium nitrite to produce a diazonium or bis-diazonium salt solution, respectively.

Next, a coupling suspension is prepared separately by dissolving a coupler in at least an equal molar ratio to a sodium hydroxide and forming a suspended precipitate with acetic acid.

The specific amine and coupler employed will be different in each case depending on the orange azo pigment being prepared. For example, if Pigment Orange 16 is desired the amine and the coupler will be o-dianisidine and acetoacetanilide, respectively. Likewise, if Pigment Orange 13 or Pigment Orange 34 are desired 3,3'-dichlorobenzidine would be the amine while the coupler would be phenylmethylpyrazolone and paratolylmethylpyrazalone, respectively.

The resulting diazonium or bis-diazonium salt solution is reacted with the suspended precipitate to form a pigment intermediate. The pigment intermediate is then filtered, washed with excess amounts of water and dried. The drying is typically carried out in a drying oven at temperatures ranging from 80 to 85° C.

The dried pigment at this point is similar to prior art orange azo pigments. The pigment is then added to a solvent to obtain a slurry containing about 5 weight percent pigment. The slurry is heated to a temperature sufficient to form the final pigment of the present invention. The heating may optionally be carried out at greater than atmospheric pressure in a closed pressure vessel wherein the pressure range up to 200 pounds per square inch (psi) The pigment is isolated by removing the solvent by any number of techniques known in the prior art, e.g. vacuum distillation or filtration.

The solvent employed in the slurrying step is selected from aromatic hydrocarbons, chlorinated aromatic hydrocarbons, aliphatic hydrocarbons, chlorinated aliphatic hydrocarbons, $C_1$–$C_6$ alcohols, $C_1$–$C_6$ ketones, ethers, $C_1$–$C_6$ acetates and water; more preferred are $C_1$–$C_6$ alcohols or water.

Pigmented systems which contain the pigment as a component of mixtures of substances, possibly in addition to other components, include: pastes, flush pastes, preparations, printing colors, distempers, binder colors or lacquers and varnishes of all kinds, such as physically and oxidatively drying lacquers and varnishes, acid, amine and peroxide curing varnishes or polyurethane varnishes. The pigment may also be present in synthetic, semisynthetic or natural macromolecular substances, such as thermoplastic resins, e.g., polyvinyl chloride, polystyrene, polyethylene, polyesters, phenoplasts, aminoplasts and rubber or in admixture with natural, regenerated or synthetic fibers, such as glass, silicate, asbestos, wood cellulose, acetylcellulose, polyacrylonitrile, polyester, polyurethane and polyvinyl chloride fibers or mixtures of the same, and powders, for example, fillers, organic or inorganic pigments. The pigment provides prints, paint and varnish coatings, coverings, shaped articles, such as sheets, threads, plates, fibers, blocks, granulates and rods having a brilliant color and excellent durability.

Substances which contain as an active coloring ingredient the orange azo pigment of the present invention, may be of solid, elastic, pasty, viscous, mobile or thixotropic consistency and may be obtained by conventional methods. Aqueous pastes, for example, may be obtained by stirring the pigment into water, possibly with the addition of a wetting or dispersing agent or by stirring or kneading the pigment into a dispersing agent in the presence of water, an organic solvent or oil. These pastes may for example be used for the production of flush pastes, printing colors, distempers, plastic dispersions and spinning solutions. The pigment may also be introduced by stirring, rolling, kneading or grinding into water, organic solvents, non-drying oils, drying oils, lacquers, varnishes, plastics or rubber. Finally, it is also possible to work up the pigment by drying mixing with organic or inorganic masses, granulates fibrous materials, powders and other pigments to form mixtures of substances.

In addition to having fluorescent properties, purity of shade, good fastness to light, weathering, solvent and migration resistance greater than for conventional orange pigments, the pigment of the present invention also shows superior thermal resistance. For example, the thermal behavior of the pigment makes it possible to work it into high and low density polyethylene or polypropylene, without the shade of color being dulled by the effect of the temperatures employed during work-up.

It is noted that the invention is deemed to include pigments resulting from a blend of the fluorescent orange azo pigments of the present invention and minor amounts of conventional pigments. The blends should exhibit similar distinguishing characteristics, inter alia, in fluorescent properties, although to a lesser degree.

Like many other pigments, the pigments of the present invention may advantageously be surface treated by known methods to improve their performance in a variety of automotive and other finish systems. Additives which serve to lessen or avoid flocculation and increase pigment dispersion stability can also be advantageously used.

The fluorescent orange azo pigments of the present invention are especially suitable for use in marking applications wherein information is encoded on a web or substrate with a fluorescent ink or coating; see for example U.S. Pat. Nos. 3,599,389; 3,614,430; and 3,760,161. Markings which include the orange azo pigments of the present invention, may be transparent, as in the case of a clear fluorescent coating. The markings may also be camouflaged or covert, as in the case of a fluorescent printing ink.

U.S. Pat. No. 4,467,207, incorporated herein by reference, describes web or sheet articles encoded with information that controls operations performed on or with the articles. The preferred marking material for, a plastic, for example, is an ink formulated with a pigment of the present invention. Markings made with such pigments offer distinct advantages over the fluorescent organic dyes markings of U.S. Pat. No. 4,467,207. Much like the organic dyes in that patent, the fluorescent pigments are also non-migratory on the web and respond to incident radiation harmless to the human eye. A detector suitable for detecting the radiation emitted from markings made with pigments of the present invention is described in U.S. Pat. No. 4,467,207.

The following examples illustrates specific aspects of the present invention and are not intended to limit the scope thereof in any respect and should not be so construed. In the examples, all parts are by weight unless otherwise indicated. The relationship of parts by weight to parts by volume is as that of kilograms to liters.

EXAMPLE 1 (comparative)

O-dianisidine (55 parts) was added to an ice/water mixture (500 parts) containing 20° Be hydrochloric acid (105 parts). The solution was stirred to a uniform consistency and formed a homogeneous suspension. A 38.5% solution of sodium nitrite (89 parts) was added to the suspension while stirring at a temperature of 30° C. to form a tetrazotized o-dianisidine solution (D). The excess nitrous acid was then removed by adding sulfamic acid (1.5 parts) and clarified by filtering. Water was added to adjust (D) to 1200 parts.

Acetoacteanilide (85 parts) was dissolved in water (740 parts) and a 50% solution of sodium hydroxide (170 parts). The mixture was stirred to dissolve the solids. The temperature of the solution was adjusted to 0 to 5° C. A precipitate (E) was formed by adding a 70% acetic acid solution (191 parts). Water was added to adjust the suspension to 1500 parts.

A coupling reaction for (D) and (E) was carried out by continuously adding (D) to (E) while stirring over a 120 minute period to form a pigment slurry intermediate (F). Stirring continued until no excess (D) remained. The temperature was then increased to 90° C. for 1 hour. The resulting pigment slurry was cooled to 70° C., filtered, washed and dried at a temperature of 80° C. to afford Pigment Orange 16, PO-16, (140 parts). The pigment was incorporated into an ink formulation for evaluation.

EXAMPLE 2

The procedure of Example 1 was repeated, then the resulting Pigment Orange 16 (50 parts) was added to water (1000 parts) to form a slurry. The slurry was stirred and heated in a closed pressure vessel to 130° C. at 25 to 35 psi for 2.5 hours. The slurry was then cooled to 70° C., filtered, washed and dried at a temperature of 80° C. to afford an improved Pigment Orange 16 (50 parts). The resulting pigment was incorporated into an ink formulation for evaluation.

EXAMPLE 3

The procedure of Example 1 was repeated, and the resulting Pigment Orange 16 (50 parts) was added to ethanol (1000 parts) to form a slurry. The slurry was stirred and heated in a closed pressure vessel to 130° C. at 60 to 70 psi for 2.5 hours. The slurry was then cooled to 70° C., filtered, washed and dried at a temperature of 80° C. to afford an improved Pigment Orange 16 (50 parts). The pigment was incorporated into an ink formulation for evaluation.

EXAMPLE 4 (comparative)

The procedure of Example 1 was repeated, except the pigment was incorporated into a coating formulation for evaluation.

EXAMPLE 5

The procedure of Example 2 was repeated, except the pigment was incorporated into a coating formulation for evaluation.

EXAMPLE 6

The procedure of Example 3 was repeated, except the pigment was incorporated into a coating formulation for evaluation.

The pigments prepared in each of the above Examples were evaluated for fluorescent properties in a coating and solvent based ink formulation.

The ink formulation was prepared by charging pigment (20 grams) to a solvent-based ink vehicle (80 grams) containing commercial grade RS nitrocellulose resin and ⅛ inch stainless steel balls (300 grams). This mixture was agitated for 30 minutes using a paint shaker to produce a millbase. The finished ink was prepared by letting back millbase (50 grams) with additional vehicle (50 grams). The ink was then mixed and strained to remove the steel balls and the viscosity of the ink was reduced to 15–16 seconds, as measured with a #3 Zahn Cup, by adding solvent. The ink was then drawn down onto a substrate with a #6 meyer rod.

The coating was prepared by charging the pigment (10 grams) to a solvent-based paint vehicle (90 grams) containing commercial grade alkyd resin and ⅛ inch stainless steel balls (300 grams). This mixture was agitated for 30 minutes using a paint shaker to produce a is dispersion. A drier mix (2 grams) was then added to the dispersion which was then mixed and strained to remove the steel balls. The coating was then drawn down onto black and white substrate with a 0.003 inch Bird Film Applicator (Form 2C-Opacity Chart, available from the Leneta Co., Mahwah, N.J.).

The results for Examples 1–6 are shown in the Table.

TABLE

| Example | Pigment | Fluorescence Visual | Fluorescence % Reflectance[a] | Relative % Increase in % Reflectance |
|---------|---------|--------|---------------|----------------|
| (1) | PO-16 | 3.1 | 89.1 | standard |
| 2 | PO-16 | 4.1 | 91.8 | 3 |
| 3 | PO-16 | 8.9 | 97.1 | 8 |
| (4) | PO-16 | — | 77.5 | standard |
| 5 | PO-16 | — | 84.2 | 9 |
| 6 | PO-16 | — | 91.7 | 18 |

[a]@ wavelength 620
( )- denotes comparative example

The Table shows that the pigments prepared by the present invention have a higher level of fluorescense than those prepared by prior art techniques.

The present invention has been described in detail, including the preferred embodiments thereof. However, it will be appreciated that those skilled in the art may make numerous variations or modifications of the embodiments that fall within the scope and spirit of the invention as set forth in the following claims.

What is claimed is:

1. A fluorescent orange azo pigment exhibiting a spectral response to incident radiation wherein the maximum response at a wavelength of 630 nanometers exceeds the response at 700 nanometers.

2. The pigment of claim 1 selected from disazo orange and monoazo orange pigments.

3. The pigment of claim 2 wherein the pigment is a diarylide orange and disazopyrazolone orange pigment.

4. The pigment of claim 3 being Pigment Orange 16.

5. A printing ink composition having incorporate therein at least one fluorescent orange azo pigment which responds to incident radiation by emitting a maximum spectral response at a wavelength of 630 nanometers exceeds the response at 700 nanometers.

6. The composition of claim 5 wherein the pigment is selected from disazo orange and monoazo orange pigments.

7. The composition of claim 6 wherein the pigment is a diarylide orange and disazopyrazolone orange pigment.

8. The composition of claim 7 wherein the pigment is Pigment Orange 16.

9. A coating composition having as a constituent thereof at least one fluorescent orange azo pigment exhibiting a spectral response to incident radiation wherein the maximum response at a wavelength of 630 nanometers exceeds the response at 700 nanometers.

10. The composition of claim 9 wherein the pigment is selected from disazo orange and monoazo orange pigments.

11. The composition of claim 10 wherein the pigment is a diarylide orange and disazopyrazolone orange pigment.

12. The composition of claim 11 wherein the pigment is Pigment Orange 16.

13. A plastic composition containing at least one fluorescent orange azo pigment exhibiting a spectral response to incident radiation wherein the maximum response at a wavelength of 630 nanometers exceeds the response at 700 nanometers.

14. The composition of claim 13 wherein the pigment is selected from disazo orange and monoazo orange pigments.

15. The composition of claim 14 wherein the pigment is diarylide orange and disazopyrazolone orange pigment.

16. The composition of claim 15 wherein the pigment is Pigment Orange 16.

17. A process for preparing a fluorescent orange azo pigment exhibiting a spectral response to incident radiation wherein the maximum response at a wavelength of 630 nanometers exceeds the response at 700 nanometers comprising:
  (a) preparing a solution of diazonium or bis-diazonium salt by adding an amine or diamine respectively, to hydrochloric acid and sodium nitrite;
  (b) preparing a coupling suspension by dissolving a coupler in a sodium hydroxide solution, and forming a suspended precipitate of the coupling suspension with acetic acid;
  (c) reacting the solution of diazonium or bis-diazonium salt with the suspended precipitate to form a pigment intermediate;
  (d) filtering said intermediate;
  (e) water washing said intermediate;
  (f) drying said intermediate at a temperature ranging from about 80° C. to about 85° C.;
  (g) forming a slurry of said intermediate in a solvent; and
  (h) heating said slurried intermediate optionally under pressure ranging up to 200 pounds per square inch.

18. The process of claim 17 wherein the solvent is selected from aromatic hydrocarbons, chlorinated aromatic hydrocarbons, aliphatic hydrocarbons, chlorinated aliphatic hydrocarbons, $C_1$–$C_6$ alcohols, $C_1$–$C_6$ ketones, ethers, $C_1$–$C_6$ acetates and water.

19. The process of claim 18 wherein the solvent is ethanol.

20. The process of claim 18 wherein the solvent is water.

21. The process of claim 17 wherein the pigment prepared is monoazo orange pigment.

22. The process of claim 17 wherein the pigment prepared is a disazo orange pigment.

23. The process of claim 22 wherein the pigment prepared is a diarylide orange and disazopyrazolone orange pigment.

24. The process of claim 23 wherein the pigment prepared is a fluorescent Pigment Orange 16.

25. An improved method for controlling operations to an article of manufacture involving (a) affixing a non-migrating mark of organic polar or ionic material to a heat-sealable polyolefin web; (b) detecting the presence of said mark on said web by sensing the presence of said emitted radiation; and (c) performing operations to said web; wherein said improvement comprises:
  substituting or combining said organic polar or ionic material with a fluorescent orange azo pigment exhibiting a spectral response to incident radiation wherein the maximum response at a wavelength of 630 nanometers exceeds the response at 700 nanometers.

26. An improved web of thermoplastic polyolefin material, which fuses under application of heat and pressure, suitable for fabrication into a series of connected but separable articles, and carrying a series of marks of organic polar or ionic material that essentially do not migrate in the web and emits wavelength-shifted radiation when exposed to incident radiation; wherein said improvement comprises:
  substituting or combining said organic polar or ionic material with a fluorescent azo orange pigment exhibiting a spectral response to incident radiation wherein the maximum response at a wavelength of 630 nanometers exceeds the response at 700 nanometers.

27. An improved web capable of being moved along a path relative to an operating mechanism, said web comprising a thermoplastic polyolefin material, which fuses under application of heat and pressure, suitable for operations including at least heat sealing into a series of articles useful as at least a part of a container, and indicia at location on said web correlated with said articles for controlling operations of the mechanism upon the web, said indicia being comprised of a polar or ionic organic material which emits wavelength shifted radiation in the non-visible spectrum, that essentially does not migrate in the web, is essentially invisible to the human eye and detectable to control the operating mechanism; wherein said improvement comprises:
  substituting or combining said organic polar or ionic material with a fluorescent azo orange pigment exhibiting a spectral response to incident radiation wherein the maximum response at a wavelength of 630 nanometers exceeds the response at 700 nanometers.

28. An improved article of manufacture comprising a thermoplastic polyolefin foil, which fuses under application of heat and pressure, and a mark on the foil, said mark being comprised of an organic ionic or polar material which responds to incident electromagnetic radiation by emitting radiation of a different wavelength to allow detection of the presence of said mark; said improvement comprises:
  substituting or combining said organic polar or ionic material with a fluorescent azo orange pigment exhibiting a spectral response to incident radiation wherein the maximum response at a wavelength of 630 nanometers exceeds the response at 700 nanometers.

29. An improved article useful in the packaging or container art and capable of being moved along a path relative to a fabricating mechanism, said article comprising a sheet or web of thermoplastic polyolefin material to be fabricated, which fuses under application of heat and pressure and indicia carried by the article for controlling the fabrication, said indicia being comprised of an organic polar or ionic material that emits wavelength-shifted radiation under incident electromagnetic radiation and that is essentially non-migrating in said material and that is essentially invisible to the human eye under electromagnetic radiation in the visible spectrum; said improvement comprises:
  substituting or combining said organic polar or ionic material with a fluorescent azo orange pigment exhibiting a spectral response to incident radiation wherein the maximum response at a wavelength of 630 nanometers exceeds the response at 700 nanometers.

* * * * *